United States Patent
Welsh et al.

(10) Patent No.: US 10,433,481 B2
(45) Date of Patent: Oct. 8, 2019

(54) ROTARY CUTTER DECK PROTECTION SYSTEM

(71) Applicant: Great Plains Manufacturing, Inc., Salina, KS (US)

(72) Inventors: Jeff Welsh, Abilene, KS (US); Erik Thorsell, Salina, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 0 days.

(21) Appl. No.: 15/377,307

(22) Filed: Dec. 13, 2016

(65) Prior Publication Data
US 2018/0160623 A1 Jun. 14, 2018

(51) Int. Cl.
*A01D 34/81* (2006.01)
*A01D 34/73* (2006.01)
*A01D 34/82* (2006.01)

(52) U.S. Cl.
CPC .......... *A01D 34/81* (2013.01); *A01D 34/736* (2013.01); *A01D 34/828* (2013.01)

(58) Field of Classification Search
CPC .... A01D 34/001; A01D 34/685; A01D 34/81; A01D 34/828; A01D 34/826; A01D 34/00; A01D 34/412; A01D 34/63; A01D 34/64
See application file for complete search history.

(56) References Cited

U.S. PATENT DOCUMENTS

| | | | | |
|---|---|---|---|---|
| 2,751,737 A * | 6/1956 | Herod | ........... | A01D 34/535 172/448 |
| 2,854,807 A * | 10/1958 | Byler | ........... | A01D 34/73 56/295 |
| 2,940,241 A * | 6/1960 | Stahl | ........... | A01D 34/63 56/17.4 |
| 3,032,957 A * | 5/1962 | Boyer | ........... | A01D 34/63 56/17.4 |
| 3,065,589 A * | 11/1962 | Summerour | ........... | A01D 34/63 56/17.5 |
| 3,134,212 A * | 5/1964 | Gary | ........... | A01D 42/005 56/16.4 R |
| 3,188,787 A * | 6/1965 | Weiland | ........... | A01D 34/81 56/16.5 |
| 3,299,622 A * | 1/1967 | Hanson | ........... | A01D 34/63 56/13.4 |
| 3,357,165 A * | 12/1967 | Thon | ........... | A01D 34/64 56/16.3 |
| 3,643,408 A * | 2/1972 | Kulak | ........... | A01D 34/63 56/17.4 |

(Continued)

*Primary Examiner* — Alicia Torres
*Assistant Examiner* — Adam J Behrens
(74) *Attorney, Agent, or Firm* — Hovey Williams LLP

(57) ABSTRACT

A protection system for a rotary cutter, with the rotary cutter including a deck and one or more blade assemblies extending below the deck for cutting vegetation. The protection system comprises a protection annulus associated with one of the blade assemblies, with the protection annulus secured to a bottom surface of the deck and positioned between the deck and the blade assembly. The protection annulus has a width extending from an inner radius of the protection annulus to an outer radius of the protection annulus. The protection annulus has a height extending vertically downward from the bottom surface of the deck. The width of the protection annulus is greater than the height of the protection annulus.

16 Claims, 7 Drawing Sheets

(56) References Cited

U.S. PATENT DOCUMENTS

| | | | | | |
|---|---|---|---|---|---|
| 3,979,827 | A | * | 9/1976 | Anzur | A01D 34/001 30/379 |
| 4,676,205 | A | * | 6/1987 | Kaufman | A01D 34/81 123/195 R |
| 4,731,981 | A | * | 3/1988 | Geringer | A01D 34/81 56/17.5 |
| 5,113,640 | A | * | 5/1992 | Colistro | A01D 34/66 56/13.6 |
| 5,129,217 | A | * | 7/1992 | Loehr | A01D 42/005 56/13.6 |
| 5,561,972 | A | * | 10/1996 | Rolfe | A01D 34/005 56/17.5 |
| 5,638,668 | A | * | 6/1997 | Kallevig | A01D 34/81 56/17.2 |
| 5,884,466 | A | * | 3/1999 | Willmering | A01D 34/81 56/320.1 |
| 6,026,635 | A | * | 2/2000 | Staiger | A01D 34/685 56/295 |
| 6,546,707 | B2 | * | 4/2003 | Degelman | A01D 34/661 56/15.2 |
| 6,594,980 | B2 | * | 7/2003 | Oka | A01D 34/661 56/15.8 |
| 8,578,692 | B2 | * | 11/2013 | Neudorf | A01D 34/81 56/320.1 |
| 2001/0042294 | A1 | * | 11/2001 | Long, Jr. | A01D 34/001 29/426.1 |
| 2002/0189223 | A1 | * | 12/2002 | Degelman | A01D 34/661 56/15.2 |
| 2009/0211217 | A1 | * | 8/2009 | Lesche | A01B 1/14 56/400.01 |

* cited by examiner

ROTARY CUTTER DECK PROTECTION SYSTEM

BACKGROUND OF THE INVENTION

1. Field of the Invention

Embodiments of the present invention relate generally to a deck protection system for agricultural equipment, such as a rotary cutter. More specifically, embodiments of the present invention are directed to a protection system configured to protect and reinforce a rotary cutter deck from impacts from blades and from debris.

2. Description of the Related Art

A rotary cutter is a piece of agricultural equipment that can be used to cut brush, grass, saplings, or other vegetation. An example of a rotary cutter is shown in FIGS. 1 and 2, and identified by reference numeral 12. In general, such a rotary cutter 12 is configured to be pulled behind a tractor (not shown), such that the tractor can propel the rotary cutter 12 as well as provide power to the rotary cutter 12. The exemplary rotary cutter 12 comprises a deck 14 with wheels 16 (not shown in FIG. 2) extending rearward from the deck 14. As such, and as discussed above, the rotary cutter 12 may be pulled behind a tractor, such as via a hitch mount assembly 17 (not shown in FIG. 2). In addition to pulling the rotary cutter 12, the tractor may be configured to provide power to the rotary cutter 12, such as via a power take-off, so as to cause actuation of blade assemblies 18 extending below the rotary cutter's 12 deck 14 (See, FIG. 2). Rotary cutters may include various numbers of blade assemblies. For example, as shown in FIG. 2, the rotary cutter 12 is illustrated with three individual blade assemblies 18, with each blade assembly 18 comprising a pair of blades 20. Each of the blades 20 may be attached to a blade carrier 22 or dishpan, which when caused to rotate by motors or gears of the rotary cutter 12, causes a corresponding rotation of the blades 20.

During operation of a rotary cutter, the rotary cutter's blades can often be forced upwards into forceful contact with a bottom surface of the rotary cutter's deck. Such impacts may take place when the rotary cutter travels over uneven ground or encounters debris (e.g., large rocks) during cutting operations. The impact of the blades onto the deck are known to cause damage to both the rotary cutter's deck and to the blades (and blade carrier or dishpan). To reduce the damage caused by such impacts, some previously-used rotary cutters included rudimentary guard rings that extend from the bottom of the rotary cutter deck. Examples of such a previously-used guard rings are identified in FIG. 2 as guard rings G. As shown in FIG. 2, an individual guard ring G can be positioned above each blade assembly 18 of the rotary cutter 12. Such previously-used guard rings G are generally formed as a thin cylindrical section of material that extends down, tangentially from the bottom surface of the deck 14. As shown in FIG. 2, the heights of the guard rings G (measured as the vertical extension of the guard rings G below the deck) is substantially larger than the width of the guard rings (measured as the distance between an inner radius and an outer radius of the guard rings G). For example, the guard rings G may have a width of about 0.5 inches, while the guard rings may extend down from the deck between 4 to 6 inches or more. The guard rings G will generally have an outer radius that is at least as large as the cutting radius of its associated blade assembly 18, such that if a blade 20 is forced upward towards the deck 14, the blade 20 will come into contact with a bottom edge of the guard ring G, as opposed to impacting the deck 14.

Although such previously-used guard rings, such as guard rings G of FIG. 2, provide protection for the bottom surfaces of rotary cutter decks, such guard rings have several disadvantages. For instance, given the thinness of the guard rings, such guard rings are prone to damage from repeated impacts from the blades or other objects (e.g., rocks or other encountered debris). Specifically, such guard rings are known to deform upon repeated or significant impacts from the blades. Upon such deformation, the guard rings are less effective at protecting the rotary cutter deck from impacts. In addition, such guard rings are also prone to allowing blades (and/or the blade carrier or dishpan) to become jammed within the guard rings. Furthermore, because the guard rings extend down from the bottom surface of the deck a significant amount (e.g., 4-6 inches), such guard rings interfere with airflow patterns generated by the rotary cutter blades. Such interference with airflow patterns can cause inefficiencies in cutting operations.

Accordingly there exists a need for a deck protection system that protects the deck of rotary cutter from blade impacts, but that does not significantly deform when impacted by blades or other objects. In addition, there is a need for a rotary cutter deck protection system that does not interfere with the movement of the rotary cutter blades. Furthermore, there is a need for a rotary cutter deck protection system that does not significantly interfere with airflow patterns generated between the deck of the rotary cutter and the ground.

SUMMARY

Embodiments of the present invention include a protection system for a rotary cutter, with the rotary cutter including a deck and one or more blade assemblies extending below the deck for cutting vegetation. The protection system comprises a protection annulus associated with one of the blade assemblies, with the protection annulus being secured to a bottom surface of the deck and positioned between the deck and the blade assembly. The protection annulus has a width extending from an inner radius of the protection annulus to an outer radius of the protection annulus, and the protection annulus has a height extending vertically downward from the bottom surface of the deck. The width of the protection annulus is greater than the height of the protection annulus.

Embodiments of the present invention additionally include a method of protecting and reinforcing a deck of a rotary cutter, with the rotary cutter including one or more blade assemblies extending below the deck for cutting vegetation. The method comprises the initial steps of fabricating a protection annulus comprising a generally cylindrical piece of material with a width extending from an inner radius to an outer radius, and a height extending from a top surface to a bottom surface. The width of the protection annulus is greater than the height of the protection annulus. The method includes an additional step of securing the protection annulus to a bottom surface of the deck of the rotary cutter. The protection annulus is secured to the bottom surface of the deck such that the protection annulus is positioned between the deck and one of the blade assemblies.

Embodiments of the present invention further include a protection system for a rotary cutter, with the rotary cutter including a deck with a blade assembly extending below the deck for cutting vegetation, and with the blade assembly including a blade carrier with a blade rotatably secured thereto, such that the blade is configured to be positioned in a collapsed configuration and an extended configuration. The protection system comprises a protection annulus secured to a bottom surface of the deck and positioned between the deck and the blade assembly. The protection annulus has a width extending from an inner radius of the protection annulus to an outer radius of the protection annulus. The protection annulus has a height extending vertically downward from the bottom surface of the deck. The width of the protection annulus is sufficient to allow the protection annulus to be positioned directly over a tip of the blade when the blade is in either the collapsed configuration or the extended configuration.

Embodiments of the present invention further include a protection system for a rotary cutter, with the rotary cutter including a deck and one or more blade assemblies extending below the deck for cutting vegetation. The protection system comprises one or more protection components associated with at least one of the blade assemblies, with the protection component being positioned between the deck and the blade assembly. The protection component extends through a portion of a blade tip zone of the blade assembly, with such blade tip zone being defined by an annular area through which a tip of a blade of the blade assembly is confined to travel as it rotates and extends and/or retracts between a collapsed configuration and an extended configuration.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 3:
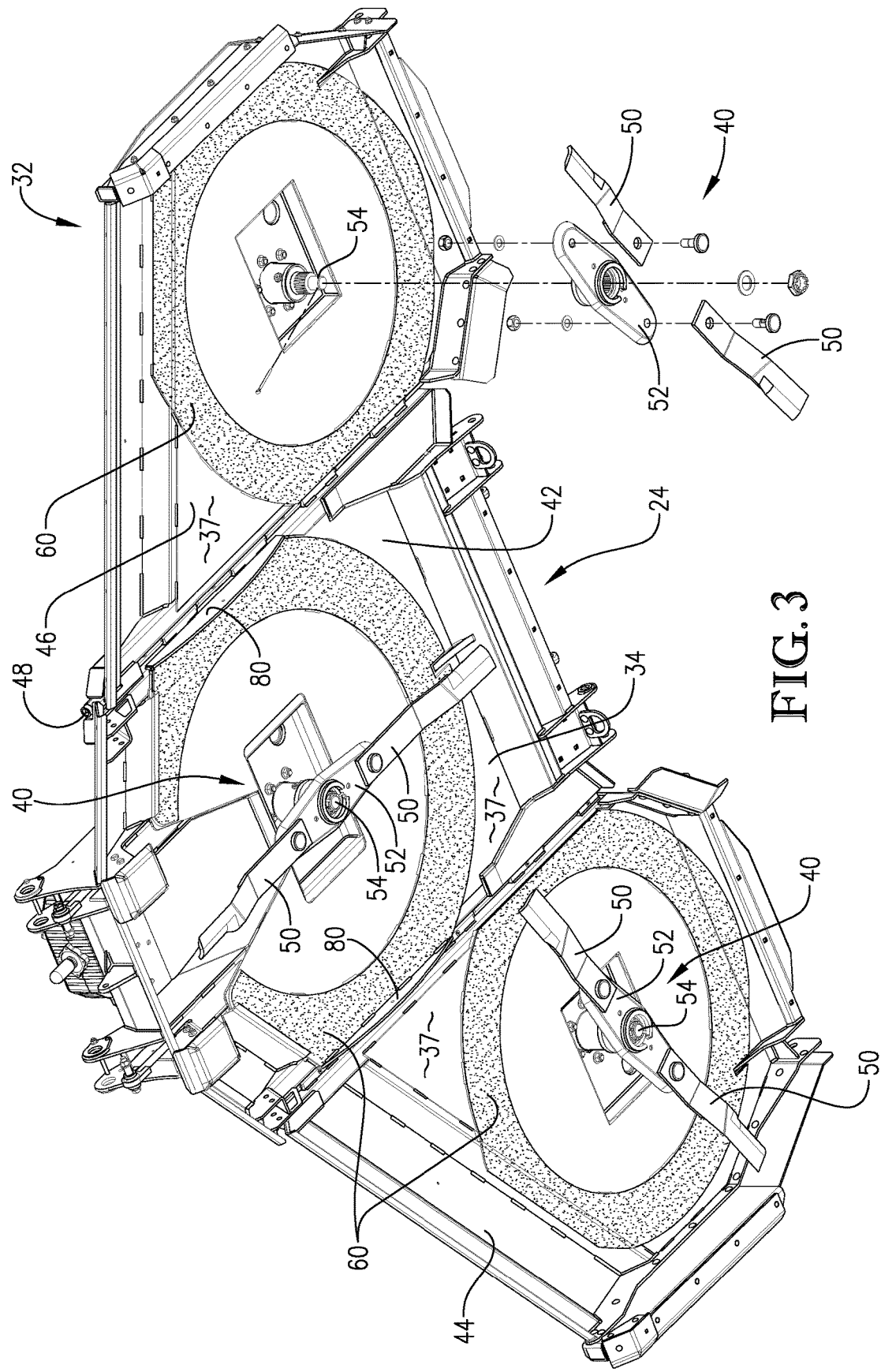
FIG. 3 is a bottom perspective view of a rotary cutter according to embodiments of the present invention, with the rotary cutter including a protection system comprising three protection annuluses attached to a bottom surface of a deck of the rotary cutter.
Figure 4:
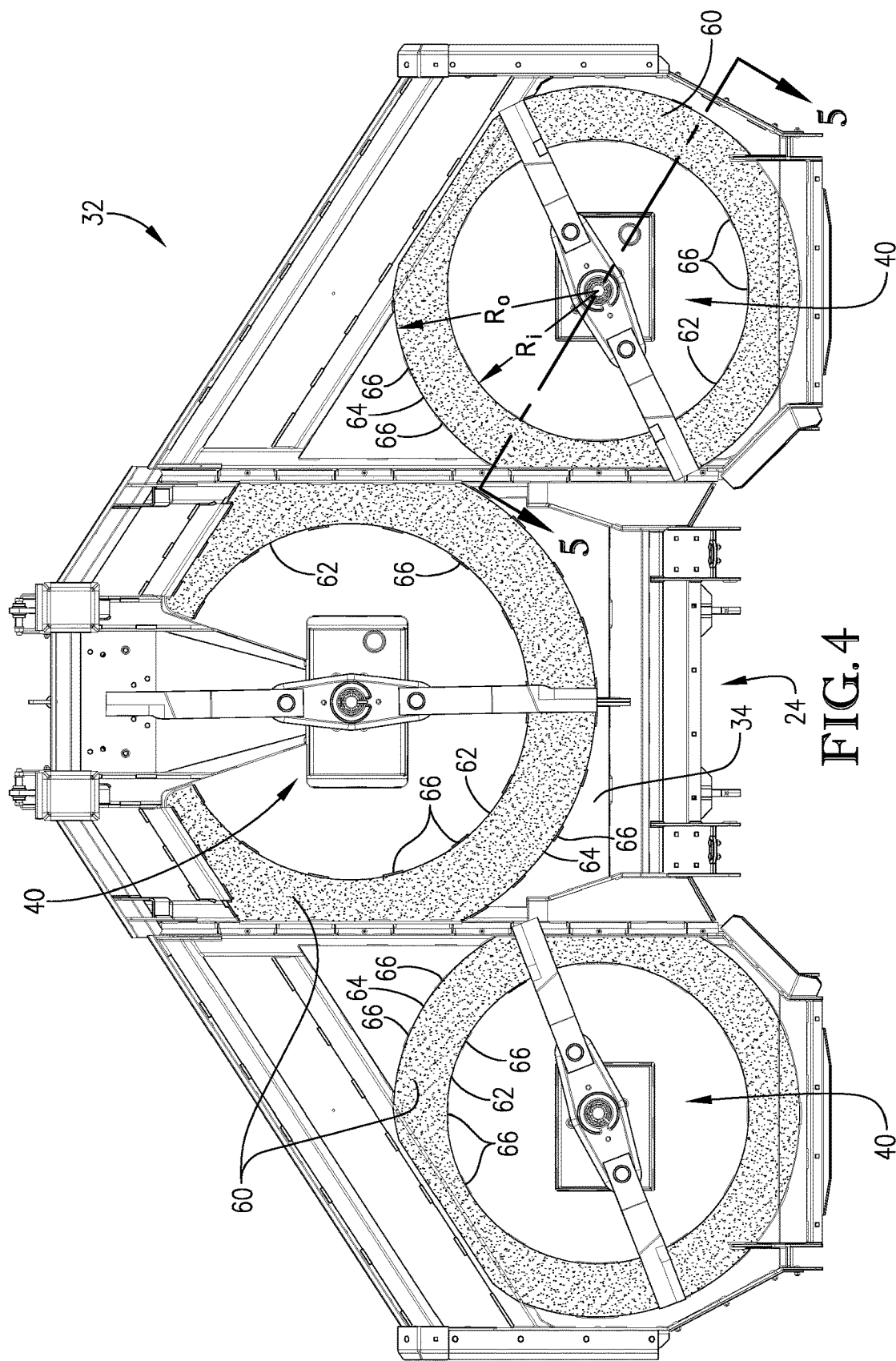
FIG. 4 is a bottom plan view of the rotary cutter from FIG. 3.
Figure 5:
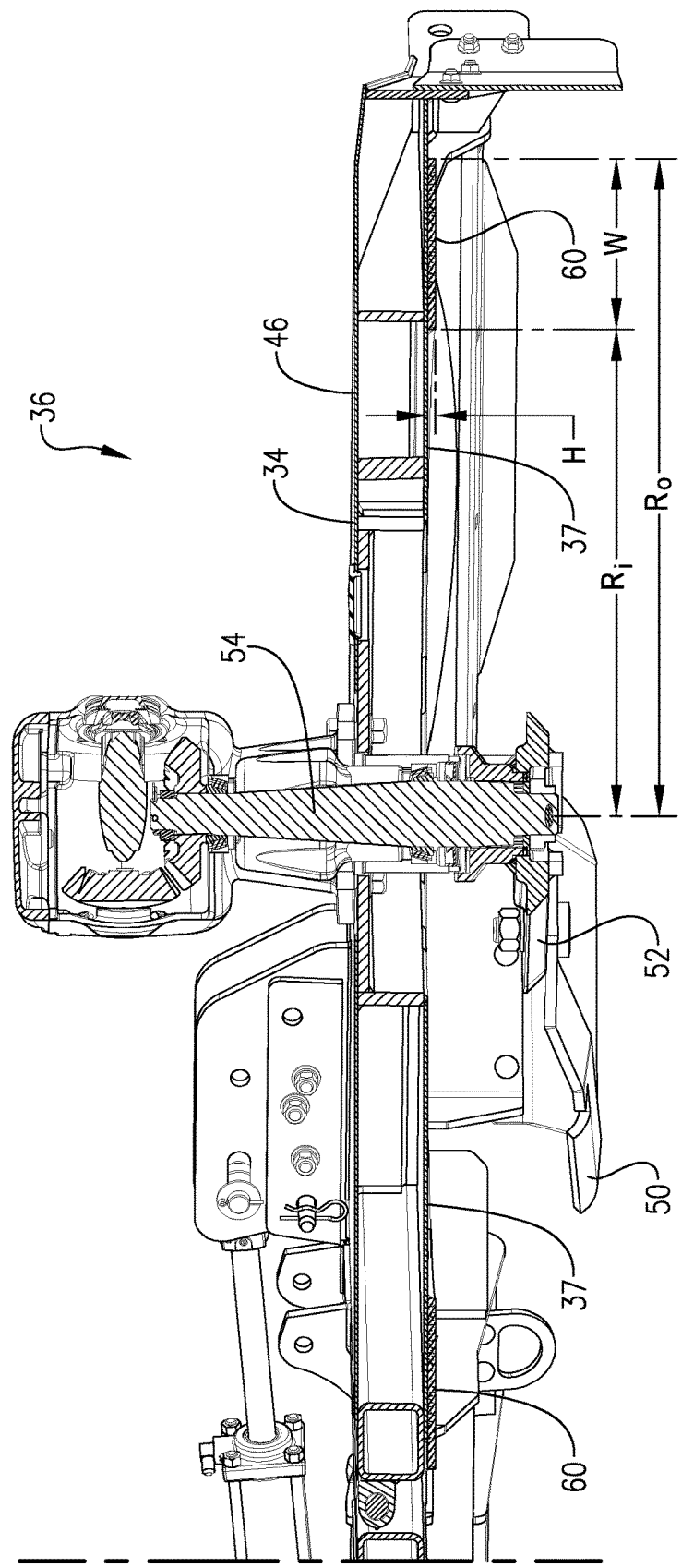
FIG. 5 is a partial cross-section of the rotary cutter from FIGS. 3-4 taken along the line 5-5 from FIG. 4.
Figure 6:
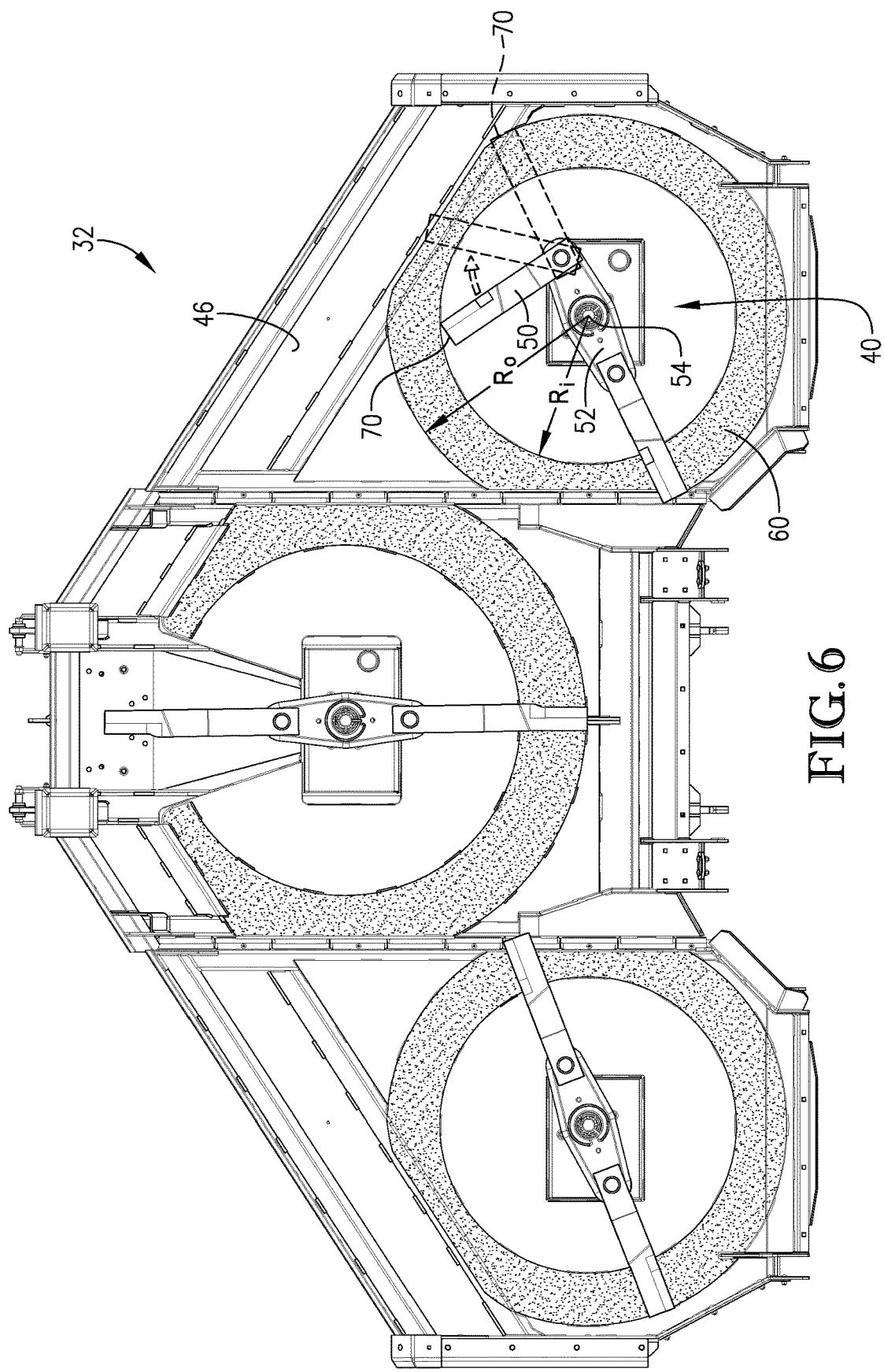
Figure 7:
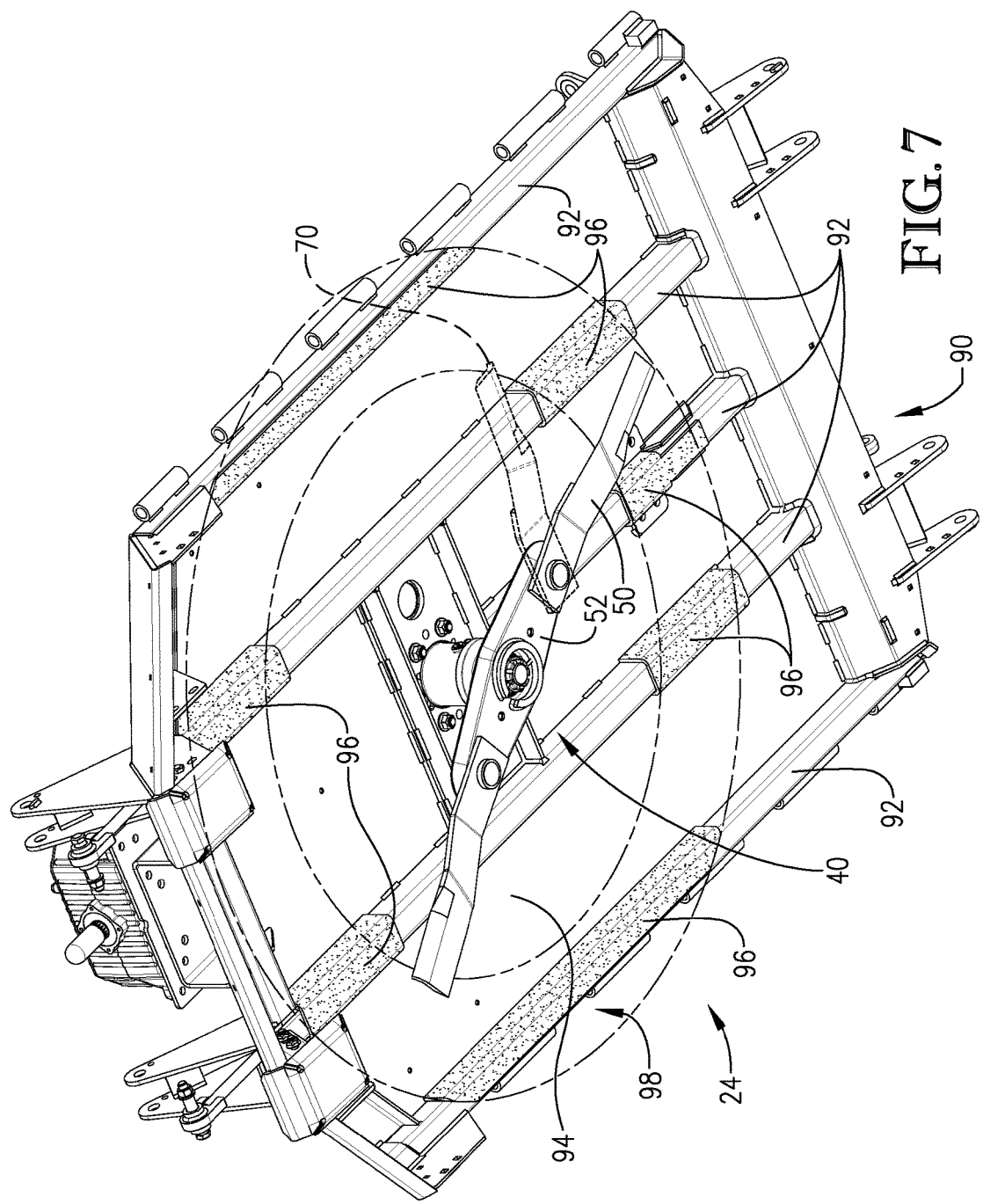

FIG. 6 is a bottom plan view of the rotary cutter from FIGS. 3-5, particularly illustrating one of the blades transitioning between a collapsed orientation and an extended orientation; and FIG. 7 is a bottom perspective view of a portion of a rotary cutter deck, particularly illustrating protection elements secured to structural pieces extending from a bottom surface of the deck, with the protection elements positioned within a blade tip zone of a blade assembly of the rotary cutter.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
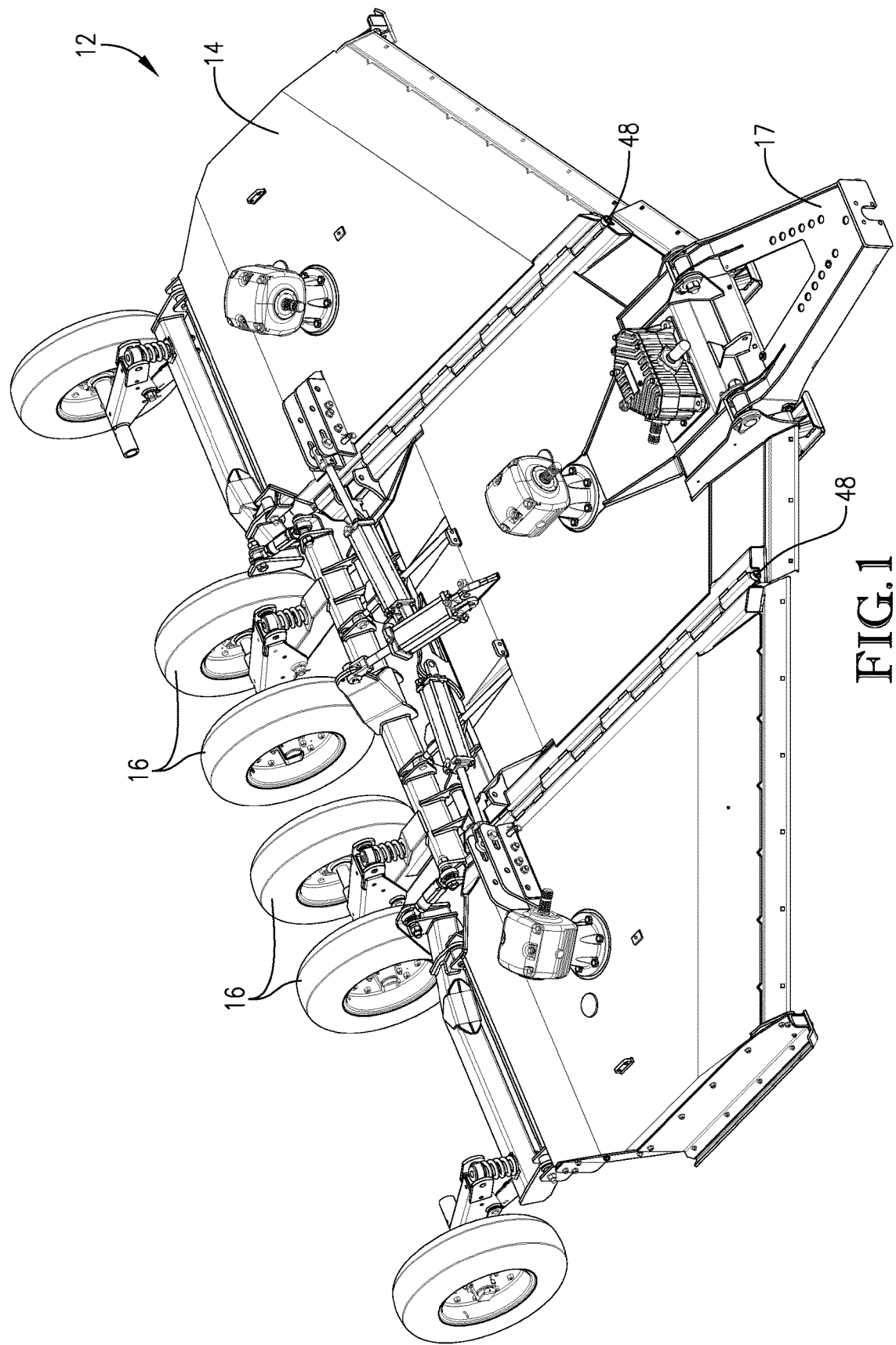
FIG. 1 is a top front perspective view of a rotary cutter.
Figure 2:
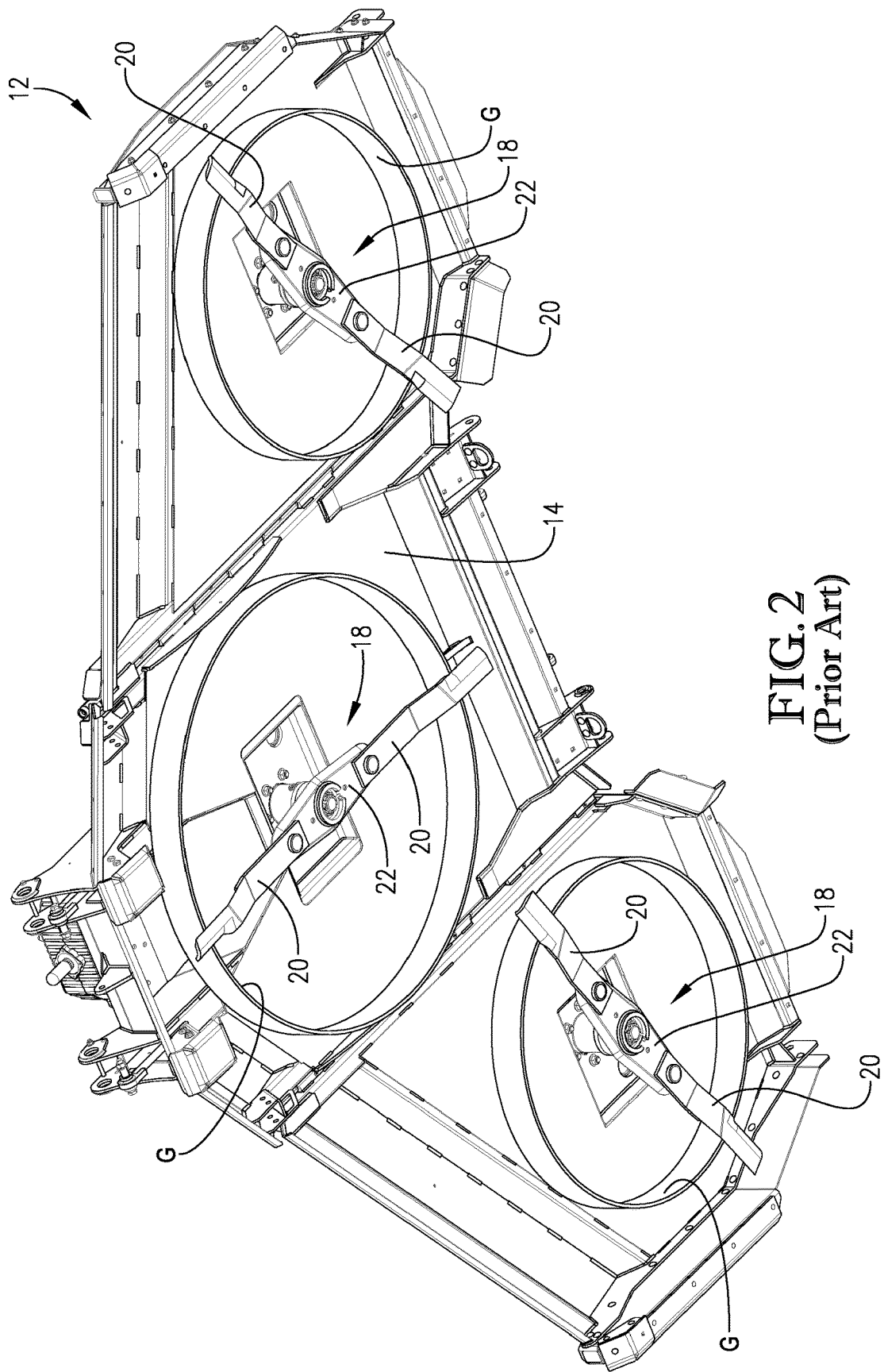
FIG. 2 is a bottom perspective view of a rotary cutter with prior art guard rings extending down from a bottom surface of a deck of the rotary cutter.

With reference to FIG. 3, embodiments of the present invention are directed to a protection system 24 for a rotary cutter 32. Although the following description of the protection system 24 is with reference to the rotary cutter 32, it is understood that embodiments may provide for the protection system 24 to be used with other types of agricultural equipment, such as other agricultural equipment with rotating blades. As described previously with respect to rotary cutter 12, the rotary cutter 32 may broadly comprises a deck 34 with a plurality of blade assemblies 40 extending below the deck 34. The deck 34 may be fabricated from various materials with sufficient strength and durability to support the rotary cutter 32 and its components. For instance, in some embodiments, the deck 34 may be fabricated from one or more sections of high-strength steel. In some specific embodiments, the deck 34 may include a bottom section of high-strength steel, which presents a bottom surface 37 of the deck 34. Such a bottom section may have a thickness of about 3/16 inches, although the specific thickness of the bottom section may vary. In some embodiments, the rotary cutter 32 may be fabricated as "winged" rotary cutter, such that the deck 34 comprises a central section 42, a right wing section 44, and a left wing section 46. The right and left wing sections 44, 46 may be hingedly connected to the central section 42, such as via a hinge tube 48 (See FIG. 1) or other hinge-like element. As such, the wing sections 44, 46 may be raised and lowered with respect to the ground about the hinge tube 48.

Remaining with FIG. 3, the rotary cutter 32 may include three independent blade assemblies 40, with each blade assembly 40 comprising a pair of blades 50 rotatably connected to a blade carrier 52. Each of the sections of the deck 34 (e.g., central section 42, right wing section 44, and left wing section 46) may have one or more blade assembly 40 associated therewith. The blade carriers 52 may be secured to rotary power components (e.g., motors or gears positioned on a top surface of the deck 34) via a drive shaft 54 (a driveshaft 54 is illustrated in detail on the left wing section 46 from FIG. 3), such that the blade carriers 52 and the blades 50 can be caused to rotate about the driveshafts 54. As such, the driveshafts 54 present a rotational axis of the blade assemblies 40, about which the blades 50 and the blade carriers 52 are configured to rotate.

It should be understood that, in some embodiments, the rotary cutter 32 may include dishpan-type elements in place of the blade carriers 52. The dishpan-type elements are generally circular plates to which the blades 50 can be secured. Such dishpan-type elements are themselves secured to the driveshafts 54, such that they generally function similar to or the same as the blade carriers 52. Furthermore, it should be understood that the rotary cutter 32 may, in some embodiments, include more or less than three blade assemblies 40, and each blade assembly 40 may, in some embodiments, include more or less than two individual blades 50 connected to a blade carrier 52.

Turning now to the protection system 24 in more detail, and with reference to FIGS. 3-4, the protection system 24 may comprise protection components in the form of one or more protection annuluses 60 secured to a bottom surface of the deck 34. The protection annuluses 60 may be fabricated from various materials having high strength and durability, such as mild-strength steel, high-strength steel, or the like. For example, in some specific embodiments, the protection annuluses 60 may be fabricated from carbon steel. In some embodiments, the protection system 24 may comprise a protection annulus 60 associated with each of the rotary cutter's 32 blade assemblies 40. For example, as illustrated in FIGS. 3-4, the rotary cutter 32 includes three blade assemblies 40, such that the protection system 24 comprises three protection annuluses 60, with one protection annulus 60 positioned above each blade assembly 40.

In more detail, the protection annuluses 60 may be secured to the bottom surface of the deck 34, such that the protection annuluses 60 are positioned between the deck 34 and the blade assemblies 40. The protection annuluses 60 may be secured to the deck 34 of the rotary cutter 32 by various methods of securement, such as by welding, fasteners (nut and bolt combinations, rivets, etc.), or the like. In some specific embodiments, the protection annuluses 60 may be skip welded to the bottom surface of the deck 34. For example, as illustrated in the FIG. 4, each of an interior edge 62 and an exterior edge 64 of the protection annuluses 60 may include a plurality of spaced apart skip welds 66 that are used to secure the protection annuluses 60 to the deck 34. However, in other embodiments, solid welding may be used.

The protection annuluses 60 may be fabricated in sizes and shapes that allow the protection annuluses 60 to be durable, while providing sufficient protection and reinforcement for the deck 34 of the rotary cutter 32. To accomplish such, each of the protection annuluses 60 may be fabricated in a low profile manner. As used herein, the term "low profile," as used with respect to the protection annuluses 60, means that a width of the protection annulus 60 is greater than a height of the protection annulus 60. In more detail, as illustrated in FIG. 4, each of the protection annuluses 60 may be fabricated as a cylindrical section of material defined by an inner radius Ri and an outer radius Ro. As such, and as perhaps best illustrated in FIG. 5, the protection annuluses 60 may have a width W defined as the difference between the magnitude of the inner radius Ri and the magnitude of the outer radius Ro. In some embodiments, the width W will have a value of between 2 and 24 inches, between 2 and 20 inches, between 4 and 16 inches, between 6 and 12 inches, or about 7.75 inches. In some specific embodiments, the width W of the protection annuluses will be at least 3 inches, at least 4 inches, at least 5 inches, at least 6 inches, at least 7 inches, at least 8 inches, at least 9 inches, or at least 10 inches. Contrastingly, to provide for the protection annuluses 60 to have low profiles, the heights H of the protection annuluses 60, illustrated in FIG. 5 as the extension of the protection annulus 60 below the bottom surface 37 of the deck 34 may be between 1/16 and 2 inches, between 1/8 and 1 inches, between 3/8 and 3/4 inch, or about 5/8 inch. In some specific embodiments, the height H of the protection annuluses will be no more than 2 inches, no more than 1 inch, no more than 0.75 inches, no more than 0.5 inches, or no more than 0.33 inches. As such, in some embodiments, the protection annuluses 60 may have a height H that is greater than a thickness of the bottom section (presenting the bottom surface 3) of the deck 34 of the rotary cutter 32. The low-profile design of the protection annuluses 60 may, in some embodiments, be defined by a ratio of the width W to the height H. For example, in some embodiments, the ratio of W:H may be at least 1:1, at least 2:1, and least 5:1, at least 10:1, at least 20:1, or more.

As will be described in more detail below, the protection annuluses 60 of embodiments of the present invention are configured to act as protection components for the deck 34 of the rotary cutter 32. Specifically, during operation of the rotary cutter 32, if a blade 50 is forced upward into contact with the deck 34, the blade 50 will contact the protection annulus 60 instead of directly contacting the bottom surface 37 of the deck 34. As such, the protection annuluses 60 function as a layer of armor to protect the deck 34 from impacts, such as from the blades 50 (as described above) or the result of objects and debris (e.g., rocks) encountered during operation of the rotary cutter 32.

To ensure that the protection annuluses 60 are properly positioned to protect the deck 34 from impacts from the blades 50, each of the protection annuluses 60 may be centrally positioned (or nearly centrally positioned) with respect to a blade assembly 40. Specifically, and as illustrated in the drawings, each of the protection annuluses 60 may be secured to the bottom surface 37 of the deck 34 in a position such that a center of the protection annulus 60 coincides (or nearly coincides) with the rotational axis of one of the blade assemblies 40. As previously described, the rotational axes of the blade assemblies 40 may be defined by the drive shafts 54 that provide rotational motion to the blade assemblies 40. In addition to the central positioning of the protection annuluses 60, the widths W of the protection annuluses 60 may be properly sized so as to ensure receipt of any impacts from the blades. In particular, the widths W of the protection annuluses 60 may allow for at least a portion of the protection annuluses 60 to be positioned directly over at least a portion of the blades 50, such that the protection annuluses are configured to receive impacts from the blades 50 regardless of the blades' 50 position with respect to the blade carriers 52.

The width W requirements of the protection annuluses 60, as necessitated in certain embodiments of the present invention, will now be described in more detail. With the protection annuluses 60 each in a centered position with respect to a blade assembly 40, the width W of the protection annuluses 60 may be sized such that at least a portion of the protection annuluses 60 are positioned directly above the blades 50 when the blades 50 are positioned in (1) a collapsed configuration, (2) an extended configuration, or (3) between the collapsed and extended configurations. In more detail, and as described above, each of the blades 50 may be rotatably connected to a blade carrier 52, such that the blades 50 are at least partially free to rotate with respect to the blade carriers 52. With reference to FIG. 6, for example, the blade assembly 40 positioned on the left wing section 46 illustrates a blade 50 swinging from a collapsed configuration to an extended configuration. In the collapsed configuration, the blade 50 is rotated towards the blade carrier 52, such that a tip 70 (i.e., a free end) of the blade 50 is positioned closer to the rotational axis (i.e., the driveshaft 54) of the blade assembly 40 and the blade carrier 52. In the extended configuration, the blade 50 is rotated away from the blade carrier 52, such that the tip 70 of the blade 50 is positioned at its furthest extent from the rotational axis (i.e., the driveshaft 54) of the blade assembly 40 and the blade carrier 52. It should be understood that the blade 50 may be in the collapsed configuration when the blade carrier 52 is not rotating or is rotating at a slow speed. Contrastingly, due to centrifugal forces, the blade 50 will transition (i.e., swing outward) from the collapsed configuration to the extended configuration when the blade carrier 52 is rotating at high, operational speeds.

To ensure that the protection annuluses 60 are properly positioned to receive impacts from the blades 50 when the blades 50 are in the collapsed configuration, the extended configuration, or in between such configurations, the widths W of the protection annuluses 60 may be sufficiently wide so as to span the distance between the position of the tips 70 of the blades 50 in the collapsed configuration and the extended configuration. Specifically, in some embodiments, the inner radius Ri of each of the protection annuluses 60 may have a magnitude that is generally equal to (or less than) the distance from the rotational axis (i.e., the driveshaft 54) of the blade carrier 52 to the tip 70 of the blade 50 when the blade is in the collapsed configuration. Similarly, the outer radius Ro of each of the protection annuluses 60 may have a magnitude that is generally equal to (or greater than) the distance from the rotational axis (i.e., the driveshaft 54) of the blade carrier 52 to the tip 70 of the blade 50 when the blade 50 is in the extended configuration. Stated differently, the protection annuluses 60 may span about a "blade tip zone," with such blade tip zone defined as the annular area through which the tip 70 of the blade 50 is confined to travel as it rotates about the rotational axis of the blade assembly 40 and extends/retracts between the collapsed configuration and the extended configuration. As such, the protection annuluses 60 can receive and absorb impacts from the blades 50 of the rotary cutter 32 regardless of whether the blades are in the collapsed configuration or the extended configuration.

In view of the above, the protection annuluses 60 of the protection system 24 function to provide reinforcement to the deck 34 of the rotary cutter 32, by acting as an additional protection layer (i.e., an armor layer) for the deck 34. Specifically, the protection annuluses 60 function to protect the deck 34 from impacts of the blades 50 during operation of the rotary cutter 32. It should also be understood that the protection annuluses 60 may also protect the deck 34 from impacts of other objects and debris (e.g., rocks) that may be encountered during operation of the rotary cutter 32. Beneficially, because the protection annuluses 60 generally have a low profile (i.e., widths W greater than heights H), the protection annuluses 60 are able to absorb repeated impacts from blades 50 without being significantly deformed. In addition, the low profile nature of the protection annuluses 60 reduces the chance of the blades 50 and/or the blade carriers 52 from being jammed up and stuck within the protection annuluses 60. Furthermore, the low profile nature of the protection annuluses 60 does not interfere with air flow patterns created by the rotation of the blades 50 during operation of the rotary cutter 32. As such, blades assemblies 40 of embodiments of the present invention are able to generate preferential air flow patterns that allows vegetation to be efficiently sucked up away from the ground and expelled from the rotary cutter 32, thereby enhancing cutting efficiencies of the rotary cutter 32. The protection annuluses 60 of embodiments of the present invention will not interfere with such preferential air flow patterns because of their low profile design.

In some additional embodiments, as illustrated in FIG. 3, the protection system 24 may include one or more vertically-extending panels 80 that extend down from the bottom surface 37 of the deck 34. For instance, the protection system 24 may include a pair of generally-planar, vertically-extending panels 80 positioned on either side of the protection annulus 60 associated with the central section 42. In such embodiments, the panels 80 may be secured to the deck 34 at a position adjacent to the outer radius Ro of the protection annulus 60. Specifically, in some embodiments, the panels 80 may be welded to the deck 34 near the hinge tube 48, where wing sections 44, 46 are hingedly connected to the central section 42. The panels 80 may function as baffles that facilitate air flow from the blades 50 in a manner (i.e., creates preferential air flow patterns) that allows grass or other material to be efficiently cut by and removed from the rotary cutter 32.

Embodiments of the present invention additionally include a method for reinforcing a rotary cutter 32 deck 34 with protection annuluses 60. In more detail, the protection annuluses 60 may be obtained by fabricating a generally cylindrical piece of material from a plate of material. As previously described, the material of the protection annuluses 60 may be mild-strength steel, high-strength steel, or the like. As such, the protection annuluses 60 may be fabricated from a plate of carbon steel, high-strength steel, or the like. The protection annuluses 60 may be fabricated in the low profile manner, such that they are fabricated with the heights H and the widths W previously described. To ensure that heights H meet the required specifications, the protection annuluses 60 may be fabricated from a plate of material that has a thickness H. The protection annuluses 60 may be fabricated by cutting the generally cylindrical piece of material from the plate of material via various cutting methods, such as laser cutting, plasma torch cutting, water cutting, electric discharge machining, or the like. The protection annuluses 60 may be cut from the plate of material such that their inner radius Ri and their outer radius Ri are sufficiently sized to provide the protection annuluses 60 with their required widths W, as previously discussed.

Once the protection annuluses 60 have been fabricated, they can be secured to the bottom surface 37 of the deck 34 of the rotary cutter 32 by various methods of attachment. As previously noted, in certain embodiments, the protection annuluses 60 may be secured to the deck 34 by skip welding. Before being secured to the deck 34, the protection annuluses 60 should be properly positioned with respect to the blade assemblies 40. Specifically, in some embodiments, the rotary cutter 32 should include a protection annulus 60 with each blade assembly 40. Each protection annulus 60 may be positioned on the bottom surface of the deck 34, such that a center of the protection annulus 60 coincides with a rotational axis (i.e., the driveshaft 54) of its associated blade assembly 40. In such centered positions, and with the widths W of the protection annuluses 60 appropriately sized (as discussed above), the protection annuluses 60 are configured provide protection and reinforcement of the rotary cutter 32 deck 34. Specifically, the protection annuluses 60 are configured to receive and absorb impacts from the rotary cutter's 32 blades 50 (or other objects and debris encountered during operation).

In addition to the embodiments discussed above, the protection system 24 may include embodiments that can be used with rotary cutters that have structures extending from the bottom surfaces of their decks. For example, FIG. 7 illustrates a portion of a deck 90 of a rotary cutter. The portion of the deck 90 illustrated in FIG. 7 is a central section. As illustrated in FIG. 7, the deck 90 differs from the deck 34 of the rotary cutter 32 discussed above in that the deck 90 includes a plurality of structural pieces 92 extending from a bottom surface 94 of the deck 90. The structural pieces 92 may be reinforcing structural pieces, such as the square tubing illustrated in FIG. 7. However, the structural pieces 92 may comprise generally any type of structural piece secured to and/or extending from the bottom surface 94 of the deck 90.

With the rotary cutter deck 90 that includes structural pieces 92 extending from the bottom surface 94 of the deck 90, embodiments of the protection system 24 may not require a protection annulus 60 extending around the entire bottom surface 94 of the deck. Instead, because the structural pieces 92 extend from the bottom surface 94 of the deck 90, a blade 50 that impacts the deck 94 will likely impact the structural pieces 92 instead of the bottom surface 94 of the deck 90. As such, certain embodiments of the protection system 24 may include protection components in the form of protection elements 96, as shown in FIG. 7, secured to and extending from the structural pieces 92. The protection elements 96 may cover the bottom and side surfaces of the structural pieces 92. As such, the protection elements 96 may be in the form of c-channels, u-channels, l-shaped members, or other shapes as may be required. The protection elements 96 may be fabricated from mild-strength steel, high-strength steel, or the like. For example, the protection elements may be fabricated (e.g., laser cut, plasma cut, water cut, electric discharge machined, etc.) from a plate of carbon steel, high-strength steel, or the like.

The protection elements 96 may be fabricated in a similar low profile manner as the protection annuluses 60, such that they are fabricated with heights that are less than their widths. In some embodiments, the heights of the protection element 96 may be similar to or the same as the heights H of the protection annuluses 60, as were previously described. However, the widths W of the protection elements 96 may vary depending on the position of the protection elements 96. In particular, as with the protection annuluses 60, the protection elements 96 should be positioned such that they are capable of receiving potential impacts from the blades 50. To accomplish such, the protection elements 96 may be positioned on the structures 90 at locations that reside within the blade tip zone of the blade assembly 40. With reference to FIG. 7, the blade tip zone is labeled as reference numeral 98 (illustrated as the annular area encompassed in broken line), and includes the annular area through which the tip 70 of the blade 50 is confined to travel as it rotates about the rotational axis of the blade assembly 40 and extends/retracts between the collapsed configuration and the extended configuration. Thus, the protection elements 96 can be fabricated with sizes and shapes that allow the protection elements 96 to cover the portions of the bottom and side surfaces of the structural pieces 92 that reside within the blade tip zone 98. The protection elements 98 can be secured to the structural pieces 92 in any manner previously described, such as welding (e.g., skip welding), mechanical fasteners, or the like. As such, the protection elements 96 are configured to receive and absorb impacts from the blades 50 of a rotary cutter (or from other objects and debris encountered during operation).

Although the invention has been described with reference to the embodiment illustrated in the attached drawing figures, it is noted that equivalents may be employed and substitutions made herein without departing from the scope of the invention as recited in the claims.

The invention claimed is:

1. A protection system for a rotary cutter, wherein the rotary cutter includes a deck and one or more blade assemblies extending below the deck for cutting vegetation, wherein each blade assembly includes a blade carrier with a blade rotatably secured thereto, wherein the blade is configured to be positioned in both a collapsed configuration and an extended configuration, wherein the protection system comprises:
   a protection annulus associated with one of the blade assemblies, wherein said protection annulus is secured to and protrudes from a bottom surface of the deck, such that said protection annulus is positioned between the deck and the blade assembly,
   wherein said protection annulus has a width extending from an inner edge defined by an inner radius of said protection annulus to an outer edge defined by an outer radius of said protection annulus, and wherein said protection annulus has a height extending vertically downward from the bottom surface of the deck, wherein the height is no more than 2 inches;
   wherein the width of said protection annulus is greater than the height of said protection annulus such that a ratio of the width to the height is at least 5:1,
   wherein the width of said protection annulus is configured such that the inner edge of said protection annulus is positioned vertically above a tip of the blade when the blade is in the collapsed configuration and the outer edge of said protection annulus is positioned vertically above the tip of the blade when the blade is in the extended configuration.

2. The protection system of claim 1, wherein a center of said protection annulus substantially coincides with a rotational axis of the blade assembly.

3. The protection system of claim 1, wherein the ratio of the protection annulus's width and height is at least 10:1.

4. The protection system of claim 1, wherein the width of said protection annulus is at least 5 inches and the height of said protection annulus is no more than 0.5 inches.

5. The protection system of claim 1, wherein said protection annulus is fabricated from carbon steel.

6. The protection system of claim 5, wherein said protection annulus is skip welded to the bottom surface of the deck of the rotary cutter.

7. The protection system of claim 1, wherein the rotary cutter comprises a central section, a left wing section hingedly secured to the central section, and a right wing section hingedly secured to the central section, wherein the rotary cutter includes three blade assemblies, with one blade assembly associated with each of the central section, the left wing section, and the right wing section, and wherein said protection system comprises three protection annuluses, with one protection annulus associated with the blade assembly on each of the central section, the left wing section, and the right wing section.

8. The protection system of claim 7, further comprising a pair of vertically-extending panels extending downward from the bottom surface of the deck, with one panel positioned adjacent to a hinged connection between the right wing section and the central section and one panel positioned adjacent to a hinged connection between the left wing section and the central section.

9. The protection system of claim 1, wherein the height of said protection annulus is greater than a thickness of a bottom section of the deck of the rotary cutter, with the bottom section presenting the bottom surface of the deck.

10. A method of protecting and reinforcing a deck of a rotary cutter, wherein the rotary cutter includes one or more blade assemblies extending below the deck for cutting vegetation, wherein each blade assembly includes a blade carrier with a blade rotatably secured thereto, wherein the blade is configured to be positioned in both a collapsed configuration and an extended configuration, wherein said method comprises the steps of:
  (a) fabricating a protection annulus comprising a generally cylindrical piece of material with a width extending from an inner edge defined by an inner radius to an outer edge defined by an outer radius and a height extending from a top surface to a bottom surface, wherein the width of the protection annulus is greater than the height of the protection annulus such that a ratio of the width to the height is at least 5:1, and wherein the height is no more than 2 inches; and
  (b) securing the protection annulus to a bottom surface of the deck of the rotary cutter, wherein the protection annulus is secured to the bottom surface of the deck such that the protection annulus protrudes from the bottom surface of the deck and is positioned between the deck and one of the blade assemblies, and wherein the width of the protection annulus is configured such that the inner edge of the protection annulus is positioned vertically above a tip of the blade when the blade is in the collapsed configuration and the outer edge of the protection annulus is positioned vertically above the tip of the blade when the blade is in the extended configuration.

11. The method of claim 10, wherein the protection annulus is fabricated from carbon steel.

12. The method of claim 11, wherein said fabricating of step (a) is performed by laser-cutting a sheet of carbon steel to fabricate the protection annulus.

13. The method of claim 11, wherein said securing of step (b) is performed by skip welding the protection annulus to the bottom surface of the deck of the rotary cutter.

14. The method of claim 10, wherein upon said securing of step (b) the protection annulus is positioned with its center coinciding with a rotational axis of the one of the blade assemblies.

15. The method of claim 10, wherein the ratio of the protection annulus's width and height is at least 10:1.

16. The method claim 10, wherein the rotary cutter comprises three blade assemblies, and wherein said fabricating of step (a) comprising fabricating three protection annuluses, and wherein said securing of step (b) comprises securing each of the three protection annuluses to the bottom surface of the deck of the rotary cutter, with one of the protection annuluses positioned between each of the blade assemblies and the deck of the rotary cutter.

* * * * *